Feb. 27, 1934.     W. G. MARTIN     1,948,588
OPTICAL SYSTEM
Filed Feb. 13, 1930
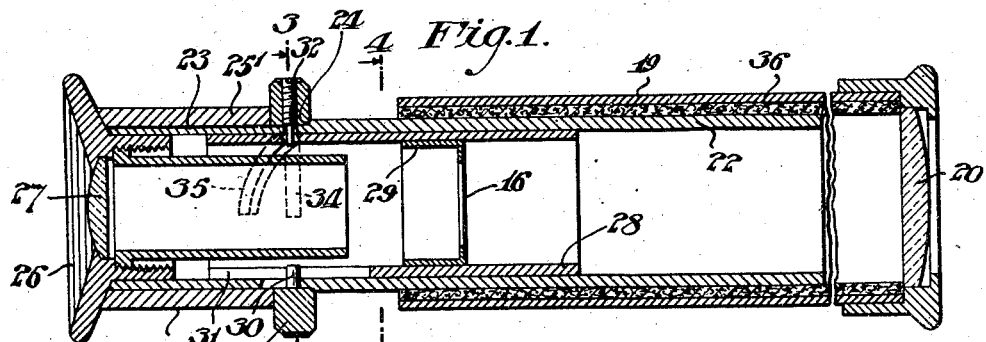
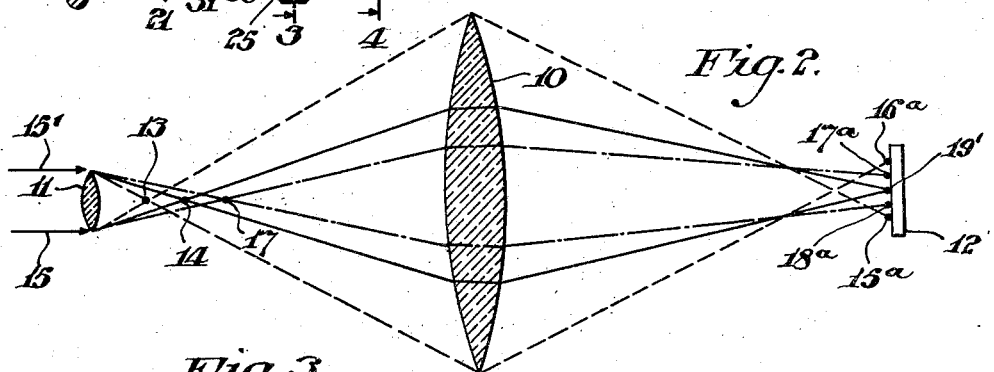
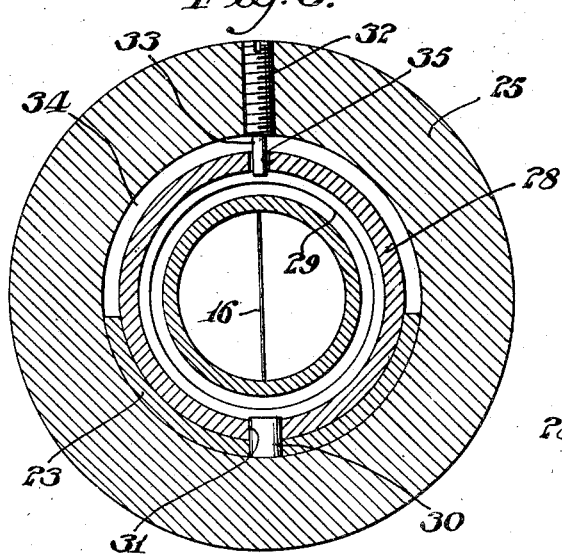
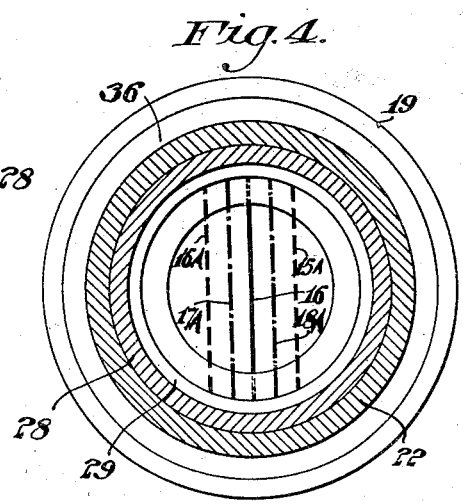
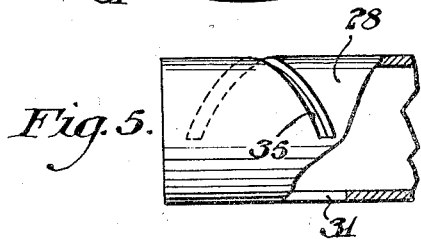
Inventor:
William G. Martin.
By Cornelius D. Ehret
his Attorney.

Patented Feb. 27, 1934

1,948,588

UNITED STATES PATENT OFFICE 1,948,588

OPTICAL SYSTEM

William G. Martin, Philadelphia, Pa., assignor to Leeds & Northrup Company, Philadelphia, Pa., a corporation of Pennsylvania Application February 13, 1930. Serial No. 428,012

2 Claims. (Cl. 88—32)

My invention relates to optical systems, particularly of precision instruments, involving telescopes or the like, as utilized, for example, in transits or other surveying instruments, theodolites, measuring microscopes, or utilized for reading the scales associated with deflecting galvanometers, and in which there is utilized a cross-hair or cross-hairs, or any equivalent index or index structure.

In accordance with my invention, it is possible to procure sharp definition of the object viewed or sighted upon, and, at the same time, by direct and rapid adjustment, and without disturbance of that relation of lens systems corresponding with sharpest definition of the object, to bring the index into the common focal plane of the lens systems with complete or substantially complete avoidance of parallax.

In accordance with my invention, in an optical system comprising a plurality of lens systems adjustable with respect to each other, for focusing upon or procuring sharp definition of the object viewed or sighted upon, the index is independently adjustable with respect to the lens systems with high degree of precision into their common focal plane; and more particularly in accordance with my invention the lens systems may first be adjusted into that relative position giving sharp definition of the object viewed or sighted upon, and thereafter, without a series of alternating trial adjustments of the lens systems and index, the index is brought immediately and directly into the common focal plane, in which optimum position the index and the object are brought in sharp focus, and parallax errors largely reduced or eliminated.

Further, in accordance with my invention, in a combination comprising objective and eyepiece lens systems, the index is comprised in the eyepiece unit and, nevertheless, is adjustable both with relation to the eyepiece lens system and the objective lens system to the aforesaid optimum position, or into the common focal plane.

My invention resides in the method and apparatus hereinafter described and claimed.

For the purpose of illustrating my invention, one embodiment thereof is shown in the drawing, wherein;

Fig. 1 is a sectional view of a telescope embodying my invention;

Fig. 2 is a diagrammatic view of an optical system illustrative of the condition of parallax;

Fig. 3 is an enlarged sectional view, the section taken on the line 3—3 in Fig. 1;

Fig. 4 is an enlarged sectional view, the section taken on line 4—4 in Fig. 1; and Fig. 5 is a fragmentary view, partly broken away, of one of the parts.

For the purpose of comprehending the nature of the present improvements, it is first important to appreciate the cause of parallax in an optical system. In this connection, reference is made to Fig. 2, showing diagrammatically an optical system comprising an objective lens system or unit, designated generally by reference numeral 10 and which may comprise one or more lenses, and an eyepiece system or unit, designated generally by reference numeral 11 and which also may comprise one or more lenses.

The eyepiece and objective lens systems 10 and 11 are represented as adjusted with respect to each other to that relative position corresponding with sharp definition of the object 12, such as a galvanometer scale. Assuming that the index or cross-hair is at the point 13, to the left of point 14 through which passes the common focal plane of the two lens systems normal to their common axis, upon sighting through the eyepiece as indicated by arrow 15 the cross-hair will appear to be at the point 15a with respect to the object, and will actually appear to the operator as shown in Fig. 4, that is, to the left of the cross-hair 16, as indicated by the broken line 15A. Upon movement of the eye across the eyepiece until the line of sight is that indicated by the arrow 15', the cross-hair will move across the scale to the right, as viewed in Fig. 4, from the position 15A to the position indicated by the broken line 16A, corresponding to the point 16a in Fig. 2. Upon movement of the eye in opposite directions across the eyepiece, therefore, the cross-hair will move similarly across the scale. This effect is known as parallax.

If the cross-hair had been at the point 17, that is, to the right of point 14, and a sighting made through the eyepiece as indicated by arrow 15, the cross-hair would appear to be at the point 17a with respect to the object, or in the position corresponding to the position shown by the broken line 17A in Fig. 4. Upon movement of the eye across the eyepiece, as before, to the position indicated by arrow 15', the cross-hair will appear to move across the object to the right, as viewed in Fig. 4, to the position indicated by the broken line 18A, corresponding to the point 18a in Fig. 2.

When, however, adjustment of the index or cross-hair is effected to exact coincidence with the point 14 in the common focal plane of the two lens systems, the index will always appear at the point 19' with respect to the object, corresponding to the position 16 of the cross-hair shown in Fig. 4, whether the eye in sighting through the eyepiece is at the position corresponding to arrow 15 or that corresponding to arrow 15', or any intermediate position. Under such circumstances there will be no parallax, and the object will be sharply defined.

Briefly, by my invention the index is adjusted, directly into the common focal plane, without need for several alternate adjustments of the lens systems and index more or less nearly approximating the conditions of sharp focus of the object and zero parallax, i. e., no apparent relative movement of the cross-hair and scale as the eye is moved in front of the eyepiece or lens 11. It is not necessary that the eyepiece and cross-hair be adjusted until neither appears to move but only until there is no relative movement. In fact, if the lens and cross-hair are adjusted so that neither appears to move in addition to no relative movement between them, the definition of the object is not at its best, and it may be difficult to read the scale accurately. The best and simplest procedure is first to adjust the lens system to obtain suitably sharp definition of the scale, and second to adjust the cross-hair for no parallax, or apparent movement of the cross-hair relative to the scale.

More specifically, in accordance with my invention certain of the lenses are first adjusted with respect to each other to obtain sharp definition of the object 12. These lenses may be in either the eyepiece or objective system, or one or more may be in the eyepiece system and one or more in the objective system, depending upon the construction of and use to which the optical system is put. After this adjustment, the index or cross-hair 16 is adjusted independently of and without disturbing the previous adjustment of the lenses until the cross-hair is substantially or exactly at the point 14 in the common focal plane of the eyepiece and objective lens systems, as determined by the fact that upon movement of the eye in opposite directions across the eyepiece, the cross-hair remains stationary with respect to the scale, or specifically in the position 16, Fig. 4, assuming that the scale appears to remain stationary. The optical system will then have been adjusted for sharp definition of the object and as well for zero parallax. For readings by different observers, it is ordinarily only necessary to change the position of the cross-hair to remove parallax introduced by differences in the human equation, since the change in definition because of differences in the eyes of observers is not so great as to require adjustment of the lens system. For different observers, the extent of movement of both scale and cross-hair may vary but in each case with the adjustment of the cross-hair to give no parallax, or relative movement of scale and cross-hair, this is of no importance and does not to any degree affect the accuracy of the readings.

A construction of telescope embodying one form of my invention will now be described, with reference more particularly to Figs. 1, 3, 4 and 5.

The objective tube 19 of the telescope is provided at one end thereof with the usual objective lens 20 constituting the objective lens system 10 in Fig. 2 or one of several lenses making up the same.

The eyepiece assembly or unit, indicated generally by reference numeral 21, comprises the tube 22 having a sliding fit in the other end of tube 19. The left end portion 23 of tube 22 is reduced to provide the shoulder 24. A manually-rotatable collar or ring 25 is disposed on and has a loose fit with respect to the reduced end portion 23, and is held in position thereon against shoulder 24 by the collar 25' having a snug fit on portion 23. The assembly 26 of usual construction, and which includes the eyepiece lens 27, is received by and has a snug fit in the reduced end portion 23 of tube 22, and by its engagement with the left-hand end of collar 25, as shown, operates to hold the latter against possible displacement to the left.

Loosely fitted within tube 22 is the collar or tube 28 within which is fixed the member 29 carrying cross-hair 16. Rotation of tube 28 with respect to tube 22 is prevented by the lug 30 struck out from the latter and extending into the longitudinally extending slot 31 in tube 28, the lug having a free fit in this slot to permit freely of longitudinal movement or adjustment of tube 28 in tube 22.

The screw 32, carried by collar 25, is provided with the reduced end portion 33 which extends freely through a slot 34 in the reduced end portion 23 of tube 22, the slot 34 disposed, generally, in a plane perpendicular to the longitudinal axis of tube 22.

As more clearly shown in Fig. 3, the reduced end portion 33 of screw 32 extends through and beyond slot 34 and is received freely by a spiral slot 35 in tube 28. From the foregoing it will be apparent that upon rotation of collar 25, and due to the cam action of the reduced end portion 33 of screw 32 with respect to the sides of spiral slot 35, the tube 28 carrying cross-hair 16 will be moved longitudinally with respect to tube 22, the direction of such movement depending upon the direction of rotation of collar 25.

In the construction shown, the pitch of the spiral slot 35 is such that upon rotation of collar 25 through substantially 180 degrees, tube 28 will be adjusted longitudinally with respect to tube 22 through a sufficient distance to provide for any desired range of adjustment of cross-hair 16 with respect to lenses 20 and 27.

The objective tube 19 may be provided with a lining 36 of felt or other suitable material.

In operating or adjusting the telescope, the eyepiece assembly 21 is first adjusted with respect to the objective lens 20 to provide sharp definition of the object, after which collar 25 is rotated in one direction or the other, as the case may be, until the operator observes that there is zero parallax, when the cross-hair 16 will be at the point 14 in Fig. 2, that is, in the common focal plane of the eyepiece lens 27 and the objective lens 20.

Each of the eyepiece and objective lens systems may comprise a single lens; or a plurality of lenses, and in the latter case focusing upon the object may be effected by relatively adjusting the lenses comprising the eyepiece and/or objective systems. Whatever the structure, however, the index is adjustable with respect to lenses of the different systems into the common focal plane.

It will be understood that while the adjustable index is preferably arranged as illustrated and described, it may be disposed to the right of tube 22, within tube 19, or elsewhere, so long as it shall be adjustable into the common focal plane, wherever that may be.

While but one structural embodiment of the invention has been shown and described, it shall be understood that various modifications are possible, such as change in the size, shape or arrangement of the parts, without departing from the spirit of the invention or the scope of the claims.

The invention claimed is:

1. A telescope for reading an instrument scale comprising an objective tube carrying an objective lens in fixed relation thereto, a second tube telescoping therewith and having a substantial range of movement longitudinally thereof, an eyepiece carried by said second tube in fixed relation thereto, a cross-hair, a third tube within said second tube and carrying said cross-hair, adjustment of said second tube to effect sharp definition of said scale simultaneously effecting equal movement of the cross-hair to an approximately correct position, and means adjustable externally of said second tube for longitudinally moving said third tube smoothly continuously through a limited range with respect thereto while maintaining said adjustment of said second tube, to effect precise adjustment of the cross-hair to a position of zero parallax between the sharply defined scale and the cross-hair without regard to the effect upon definition of the cross-hair.

2. A telescope for reading an instrument scale comprising a tube carrying an objective lens in fixed relation thereto, a second tube telescoping therewith and carrying an eyepiece, a cross-hair tube within said second tube and movable therewith as a unit simultaneously to procure sharp definition of the scale and approximately correct position of the cross-hair, and means carried by said second tube and operable from the exterior thereof to effect smoothly continuous longitudinal movement of the cross-hair tube to a position of zero parallax between the sharply defined scale and the cross-hair irrespective of the effect upon definition of the cross-hair.

WILLIAM G. MARTIN.